United States Patent
Subrahmanyan et al.

(10) Patent No.: US 6,882,662 B2
(45) Date of Patent: Apr. 19, 2005

(54) POINTER ADJUSTMENT WANDER AND JITTER REDUCTION APPARATUS FOR A DESYNCHRONIZER

(75) Inventors: Ravi Subrahmanyan, Windham, NH (US); Jeffrey W. Spires, Plaistow, NH (US)

(73) Assignee: Applied Micro Circuits Corporation, Andover, MA (US)

( * ) Notice: Subject to any disclaimer, the term of this patent is extended or adjusted under 35 U.S.C. 154(b) by 862 days.

(21) Appl. No.: 09/876,297

(22) Filed: Jun. 7, 2001

(65) Prior Publication Data

US 2002/0186719 A1 Dec. 12, 2002

(51) Int. Cl.$^7$ ................................................. H04L 3/07
(52) U.S. Cl. ........................ 370/506; 370/516; 375/372
(58) Field of Search ................................. 370/468, 516, 370/518, 503–507; 375/354, 363, 371–373

(56) References Cited

U.S. PATENT DOCUMENTS

| | | | | |
|---|---|---|---|---|
| 5,052,025 A | * | 9/1991 | Duff et al. | 370/516 |
| 5,052,031 A | * | 9/1991 | Molloy | 375/376 |
| 5,119,406 A | * | 6/1992 | Kramer | 375/372 |
| 5,131,013 A | * | 7/1992 | Choi | 370/506 |
| 5,200,982 A | * | 4/1993 | Weeber | 375/372 |
| 5,337,334 A | * | 8/1994 | Molloy | 375/372 |
| 5,402,452 A | | 3/1995 | Powell et al. | 375/372 |
| 5,404,380 A | * | 4/1995 | Powell et al. | 370/516 |
| 5,457,717 A | * | 10/1995 | Bellamy | 370/516 |
| 5,528,530 A | * | 6/1996 | Powell et al. | 708/490 |
| 5,548,534 A | | 8/1996 | Upp | 364/514 R |
| 5,796,796 A | * | 8/1998 | Wang | 375/372 |
| 5,835,543 A | | 11/1998 | Mazzurco et al. | 375/372 |
| 6,088,413 A | * | 7/2000 | Autry et al. | 370/516 |
| 2002/0144169 A1 | * | 10/2002 | Ranganath et al. | 713/400 |

OTHER PUBLICATIONS

"Design and Performance Verification of a SONET–to–DS3 Desynchronizer" R.W. Hamlin and B. Parruck, Proc. IEEE Globecomm '91, pp 761–764, 1991.

"Cancellation of Pointer Adjustment Jitter in SDH Networks", H. Sari and G. Karam, IEEE Transactions on Communications, V42, No. 12, pp 3200–3207, 12/94.

"Synchronous Optical Network (SONET)—Jitter at Network Interfaces" Standard Committee T1 Telecommunications, T1X1.3/2001–008, T1.105.03, pp 1–42; with Annex H "DSI Wander Budget" pp. 1–11.

* cited by examiner

*Primary Examiner*—Duc Ho
*Assistant Examiner*—Phuongchau Ba Nguyen
(74) *Attorney, Agent, or Firm*—Weingarten, Schurgin, Gagnebin & Lebovici LLP

(57) ABSTRACT

An apparatus for reducing the effects of pointer adjustments, wander, and jitter during desynchronization of a non-uniformly gapped data stream from a payload of a synchronized signal is disclosed. The apparatus utilizes a combination of two pointer adjustment signals embedded in the synchronized signal to determine a bit leak rate of bits from an elastic store following a pointer adjustment event such that the elastic store provides as an output a more-uniformly-distributed-gapped data stream.

13 Claims, 7 Drawing Sheets

POINTER ADJUSTMENT WANDER AND JITTER REDUCTION APPARATUS FOR A DESYNCHRONIZER

CROSS REFERENCE TO RELATED APPLICATIONS N/A

STATEMENT REGARDING FEDERALLY SPONSORED RESEARCH OR DEVELOPMENT N/A

BACKGROUND OF THE INVENTION

In a synchronous communications network, digital payload data is carried on a particular clock frequency within a synchronous message format. This payload data may include both asynchronous digital data and synchronous digital data originating at a different data rate in a foreign digital network. The Synchronous Optical Network (SONET) and its European counterpart the Synchronous Digital Hierarchy (SDH) provide a standard format of transporting digital signals having various data rates, such as a DS-0, DS-1, DS-1C, DS-2, or a DS-3 signal and their European counterparts within a Synchronous Payload Envelope (SPE), or a container that is a part of a SONET/SDH STS-N/STM-N message frame. In addition to the digital data that is mapped and framed within the SPE or container, the STS-N/STM-N message frame also includes overhead data that provides for coordination between various network elements.

One of the benefits of SONET is that is can carry large payloads (above 50 Mb/s). However, the existing slower speed digital hierarchy can be accommodated as well, thus protecting investments in current equipment. To achieve this capacity, the STS Synchronous Payload Envelope (SPE) can be sub-divided into smaller components or structures, known as Virtual Tributaries (VT) for the purpose of transporting and switching payloads smaller than the STS-1 rate. All services below the DS3 and E-3 rates are transported in the VT structure.

In SONET there are four sizes of virtual tributaries, a VT-6 (12 columns of data), VT-3 (6 columns of data), VT-2 (4 columns of data), and VT-1.5 (3 columns of data). A virtual group (VG) is formed of a single type of VT and by definition each VG contains 12 columns of data. Thus, there can be one (1) VT-6, two (2) VT-3, three (3) VT-2, or 4 VT-1.5 VTs per VG. Because there are 12 data columns per VG, there will be seven VGs within a single STS-1 SPE, with a column of data providing the path overhead data and two (2) columns of stuff data. The VGs are grouped within a Virtual Superframe that comprises four (4) consecutive STS-1 message frames, or 28 VGs. The 28 VGs within the superframe each have varying numbers of VTs within them, and together define a virtual SPE. The VTs contained within the virtual SPE may be operated in a fixed or floating mode. In a fixed mode, the VT mapping into the four (4) STS-1 SPEs comprising the superframe is fixed. This reduces the interface complexity and is designed for maximum efficiency of the network elements. A floating VT mode allows the VT to float within the virtual SPE defined for the VTs. A floating VT requires a VT payload pointer and VT path overhead. In the case of a VT floating within virtual superframe, the VT payload pointer is defined by bytes, V1, V2. In addition, payload resynchronization and payload adjustment is accomplished using the V1, V2, and V3 in the same manner as the H1, H2, and H3 bytes in the transport overhead of the STS-1 message as described below.

Similarly, in a SDH STM-1 message, which is based on a 1.5 Mbit/s hierarchy, there is a bandwidth flexible virtual container (VC) that allows the transmission of high-speed packet switched services, ATM, contribution video, and distribution video. In addition, the VC allows transport and networking at the 2 Mbit/s, 34 Mbit/s, and 140 Mbit/s in addition to the 1.5 Mbit/s hierarchy.

The lowest level of multiplexing in a SDH message includes a single container (C). The containers are used to create a uniform virtual container (VC) payload through bit-stuffing to bring all the inputs to the container to a common bit-rate that is suitable for multiplexing in the VCs. There are two levels of VCs. A low level VC, i.e., VC-11, VC-12, and VC-2, that include data at a rate from 1.5 Mbit/s to 6 Mbits/s. Upper level VCs, i.e., VC-3 and VC-4, include data at a rate of 34/45 Mbit/s and 140 Mbit/s. The various VCs are converted into Transmission Units(TUs) with the addition of tributary pointer information. Thus, a VC-11 becomes a TU-11, a VC-12 becomes a TU-12, a VC-2 becomes a TU-2, and a VC-3 becomes a TU-3.

A single TU-2 or 3 TU-12s, or 4 TU-11s are combined into a Transmission Unit Group 2(TUG-2). Seven TUG-2s can be used to form a VC-3 or a TUG-3 message. Three TUG-3s are combined to form a VC-4. Three VC-3s or a single VC-4 are converted into an administrative unit three (AU-3) or an AU-4 respectively, with the addition of an administrative unity pointer. Three AU-3s or a single AU-4 are formed into an Administrative Unit Group (AUG). One AU-4, four AU-4s, or 16 AU-4s are formed into an STM-1 message, STM-4 message, or an STM-16 message respectively. The administrative unit group forms the SPE of the SDH STM-1 message.

In a floating TU mode, four consecutive 125 microsecond frames of the VC-4 are combined into a single 500 microsecond called a TU multi-frame. The tributary units comprising the TU multi-frame signal also contains payload pointers to allow for flexible and dynamic alignment of the VCs within the TU multi-frame. In this instance, the payload pointer value indicates the offset from the TU to the first byte of the lower order VC. This mechanism allows the AU and TU VC payloads to vary with respect to phase to one another and to the network, while allowing the VCs comprising the AUs and TUs to be synchronously multiplexed. The TU multi-frame overhead consists of four bytes: V1, V2, V3, and V4. Each of the four bytes is located in the first bytes of the respective TU frame in the TU multi-frame signal. The V1 and V2 bytes designate the position of the first byte of the VC, the V3 byte provides a payload pointer adjustment opportunity, and the V4 byte is reserved. Thus each of the VCs within an STM can float relative to one another If the digital data that is mapped and framed in the STS-N/STM-N message was originally carried by a clock signal having a different frequency than the SONET/SDH line rate clock, certain adjustments to the framed digital data must be made. For example, if a DS-3 data signal, which is carried by a 44.736 MHz DS-3 clock signal is to be carried in a SONET/SDH fiber-optic network, the DS3 signal is mapped into the higher rate SPE of an STS-1 message, extra bits must be added to the DS-3 signal prior to transmission through the SONET/SDH network. These extra bits are commonly referred to as stuff bits or gap bits and are merely place markers and in general carry no valid data. These gap bits are required because the DS-3 signal is slower than the SONET/SDH clock frequency so that there are not enough DS-3 bits at the higher frequency to form a complete SONET frame. More detail may be found in the Bellcore specification "SONET Transport Systems: Common Generic Criteria", GR-253-CORE, Issue 3, September 2000, the Bellcore specification "Transport Systems Generic Requirements (TSGR): Common Requirements", GR-499-CORE, Issue 2, December 1998, and the ITU-T Recommendation G.783, "Characteristics of Synchronous Digital Hierarchy (SDH) Equipment Functional Blocks", January 1994.

When the STS-1 message is received at a network exit node, the overhead bytes are removed from the SONET STS-1 message and replaced by gaps in the data stream. The payload data that remains is de-framed and de-mapped into a data stream carried by a higher clock frequency than the nominal original clock frequency of the payload data. Thus the stuff data that was inserted when the data was mapped into the SPE remains when the data stream is recovered from the SPE and is also replaced by gaps in the data stream. Thus, the recovered payload data contains gaps in the data stream remaining after the overhead bytes and stuff data bits have been removed. If, for example, DS-3 data has been transported via a SONET/SDH network, the DS-3 data must be converted from the SONET clock signal to the lower frequency DS-3 clock signal and the gap data bits must be removed prior to the DS-3 signal being B3ZS-encoded for electrical re-transmission.

To transfer data from one clock domain to another, for example from the DS-3 embedded within the SONET signal rate to the proper DS-3 signal rate, a desynchronizer is used to provide a buffering mechanism between the clock domains. A desynchronizer typically includes an elastic store first-in-first-out memory buffer that receives gapped data recovered from a synchronized data payload as an input at one clock frequency and stores the data in appropriate storage locations. Data is read from the elastic store buffer at a different clock frequency and is provided as output data at that frequency. This output data does not contain the gap data bits that were added when the slower signal was mapped into the faster SONET/SDH STS-1 message.

Once the data has been de-mapped and de-framed from the SPE and the gaps removed, a phase locked loop (PLL)is typically used to recover the clock information and to adjust the read signal associated with the data stored in the elastic store for transmission downstream as a data signal carried by a smooth clock signal.

Although the SONET/SDH fiber optic network is a synchronous network, variations in clock signals across the network may occur. These variations in clock signals between various network elements may cause a loss of data downstream from the sender if the clock signal at which data was written to the synchronous signal and the clock signal at which the data was read from the synchronous payload are sufficiently different. A variety of conditions can cause variations in clock signals. For example, network clock instability, electrical noise and interference, effective changes in the length of transmission media, changes in the velocity of propagation, Doppler shifts, and irregular timing information and other electrical and network problems may all cause clock variations.

To mitigate the problems caused by clock variations across a network, the SONET/SDH STS-N/STM-N messages are provided with a pointer adjustment mechanism within the transmission overhead bytes that allow for some movement of the data within the SPE. The pointer adjustment mechanism includes a pair of bytes, H1 and H2, that identify the start of the next SONET/SDH payload byte and also indicate if the pointer adjustment byte, H3, is to be used. The third overhead byte, H3, provides for active pointer adjustment when a negative justification of the SPE is required. Negative justification involves posting valid data in the H3 byte. Positive justification involves marking the byte after the H3 byte as a dummy or stuff byte. These pointer adjustments allow for eight (8) bits of data to be added to a SONET/SDH message frame (using the H3 overhead byte) or for eight (8) bits to be removed from the frame. This allows for the SPE to be re-framed and re-synched at a network node that has a slightly different network clock. Thus, in addition to the gap data necessary to compensate for payload data that is carried by a different frequency clock signal, eight bits of data may be added or removed at each network element in the network due to clock instability in the network.

Pointer adjustments can be periodic or aperiodic in nature. A periodic pointer adjustment may be caused, for example, when the SPE transporting the data has a constant clock offset at the output node of the network relative to the input node. An aperiodic or non-periodic pointer adjustment may be bursty in nature when caused by a transient problem or condition within the network.

Although the synchronous system may adjust the payload data using pointer adjustments to account for clock and phase variations, the clock and phase shifts caused by the pointer adjustments and/or the de-gapping of the payload data can affect the output rate of the data clock provided by the PLL. Typically, clock and phase shifts have two components. One is a high frequency jitter component that is classified as a clock or phase shift that is greater than 10 Hz. A second is a low frequency wander component that is classified as a clock or phase shift that is less than 10 Hz.

Jitter refers to the phase variations in the clock signal, which may cause errors in identifying bit positions and values accurately, and is therefore an issue in synchronous systems. The jitter requirement for SONET can be found in the ANSI document "Synchronous Optical Network (SONET)—Jitter at Network Interfaces", ANSI-T1.105.03-1994. Wander refers to phase variations that typically affect the frame and time-slot synchronization. The wander requirement for SONET can be found in the ANSI document "Synchronous Optical Network (SONET)—Jitter at Network Interfaces—DS3 Wander Supplement", ANSI-T1.105.03b-1997. Each network element adds some amount of noise to the SPE that eventually contributes to the timing instability in the form of jitter and wander in the recovered payload signal.

As is known, the PLL used to recover the smooth clock signal and smooth data signal is able to smooth out some phase jumps caused by pointer adjustments or asynchronous stuff bits. A PLL is most effective at filtering out high frequency jitter components, i.e., those with a frequency greater than 10 Hz., but is less effective at filtering out the low frequency wander components. Since, typically the wander components are much less than 10 Hz. these wander components are well within the bandwidth of the PLL and are passed without being attenuated. To construct a PLL with a small enough bandwidth to filter the wander components of the phase jumps, large time constants in the PLL control loops would require large component values for the resistors and capacitors used in the PLL. In addition, the large time constants required would result in a PLL that is slow to lock onto the reference signal and would cause long delays in recovering lock after a transient event.

One source of wander errors in the output data rate can be caused by the pointer adjustments within the synchronous signals. Each pointer adjustment signal or asynchronous gap data results in a data gap for a given number of clock cycles. For example, an 8-bit pointer adjustment that occurs once a second or more is a low frequency change in the data rate. Redistributing this signal into a higher frequency, for example 1 bit every $\frac{1}{8}$ of second, aids the PLL in filtering and recovering the underlying data signal.

When a pointer adjustment is received however, there will be eight (8) bits that are added to the elastic store or skipped and not written to the elastic store. The inconsistent nature of the gapped data can result in large changes in the data output rate. The ratio between the input data rate and the output data rate may change by a value sufficiently large that the elastic store can experience a data overflow condition or a data underflow condition. Data overflow occurs when data is written to the elastic store at a faster rate than usual, or read at a slower rate than usual, causing the elastic store to accumulate data. The elastic store will be unable to store all of the incoming data, and data will be lost. Similarly, data underflow occurs when data is written to the elastic store at a slower rate than usual, or read at a faster rate than usual, causing the elastic store to lose data. In this circumstance no data will be read from the elastic store.

Typically, the elastic store used in the desynchronizer will have a write/read control system that attempts to maintain the output data rate at a specified rate, and maintain the elastic store at a predetermined fill level. If the elastic store begins to overfill, the write/read control system will increase the data output rate of the elastic store until the proper storage level in the elastic store is reached. Once the proper storage level is reached, the write/read control system will decrease the data output rate. If the elastic store begins to underfill, the write/read control system will decrease the data output rate of the elastic store until the proper storage level in the elastic store is reached. Once the proper level is reached, the write/read control system will increase the data output rate.

Typically, pointer adjustments are resolved by "leaking" bits from the elastic store at a predetermined rate over a predetermined period of time. Leaking the bits one at a time prevents the excess bits from the pointer adjustment from negatively affecting the output data rate. Yet, as noted above, pointer adjustments may occur either periodically or non-periodically. A constant "bit leaking" rate is unable to adequately leak bits to cover a wide range of periodic pointer adjustments or bursty non-periodic pointer adjustments. If sporadic pointer bursts occur on top of the periodic pointer adjustments due to the effect of the TUG-3 or virtual superframe signal carried in the SDH or SONET signal respectively, or if multiple pointer adjustments occur in a bursty fashion the fixed bit leak rate would be unable to respond and overflow or underflow of the elastic store may occur.

As noted above, the VT or VC-4 pointer bytes V1, V2, and V3 operate in the same manner as the H1, H2, and H3 pointer bytes described herein. Similar problems related to the processing of the VT pointer bytes occurs, and the positive justification of the VT pointer bytes is accomplished by assigning the bytes immediately after the V3 byte as a positive stuff opportunity byte. Negative justification is accomplished by assigning the V3 byte to contain valid data. The frequency and polarity of the pointer adjustments to the VT pointer bytes is uncorrelated to the frequency of the pointer adjustments made to the SONET/SDH pointer bytes. In addition, the wander and jitter associated with the pointer adjustments is also uncorrelated between the transport overhead pointer bytes and the VT overhead pointer bytes.

Thus it would be advantageous to provide a desynchronizer that is able to provide extracted data at an output rate having reduced jitter and wander and be able to adapt the output data rate to a plurality of pointer adjustments without sacrificing data integrity.

BRIEF SUMMARY OF THE INVENTION

An apparatus for reducing the effects of pointer adjustments, wander, and jitter during desynchronization and recovery of a payload data stream from a synchronized signal is disclosed. The apparatus utilizes a combination of two statistically independent pointer adjustment signals embedded in the synchronized signal to determine a bit leak rate of bits from an elastic store following a pointer adjustment event such that gaps in the recovered data stream are more uniformly distributed than the gaps in the data received from the synchronous payload.

In one embodiment, the apparatus comprises a pointer encoder that receives first and second pointer signals and forms a composite pointer adjustment signal that has a period and a magnitude. A first filter receives the composite pointer adjustment signal and is configured and arranged to filter the magnitude of the composite pointer adjustment signal. The second filter receives the composite pointer adjustment signal and is configured and arranged to filter the period of the composite pointer adjustment signal. A bit leak rate calculator is coupled to the first and second filters and receives the filtered magnitude and period signals and is configured and arranged to provide a bit leak rate value. An offset generator is coupled to the bit leak rate calculator and receives the bit leak rate value and is configured and arranged to provide a center offset value. An elastic store that has a plurality of storage locations, of which at least a portion contain data, is configured and arranged to provide an elastic store fill value indicative of the portion of storage locations containing data, and the elastic store is also configured and arranged to provide an elastic store center value indicative of the median storage location. A prefilter receives a system clock signal, the elastic store fill value, the elastic store center value, and the center offset value, and the prefilter is configured and arranged to provide a smooth read enable signal to the elastic store, wherein the elastic store provides a plurality of uniformly gapped output data.

A method is also disclosed to provide a uniformly gapped data signal from an elastic store. A bit leak rate is determined that is a function of the composite pointer adjustment signal formed from the first and second pointer adjustment signals, an elastic store fill value, which is indicative of the amount of data stored in the elastic store, and an elastic store center value, which is indicative of the median storage location in the elastic store. A center offset value is determined as a function of the elastic store fill signal, the composite pointer signal, and the bit leak rate. A uniform data signal is formed as a function of the center offset value, the elastic store center value, and the elastic store fill value.

In one embodiment, the bit leak rate value is calculated as a function of the magnitude of the composite pointer adjustment signal and/or the period of the composite pointer adjustment signal.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Although the apparatus described herein may be used as part of a desynchronizer in any synchronous communication system, the embodiments described herein will be described as part of a synchronous optical network (SONET) receiver and desynchronizer.

Figure 1:
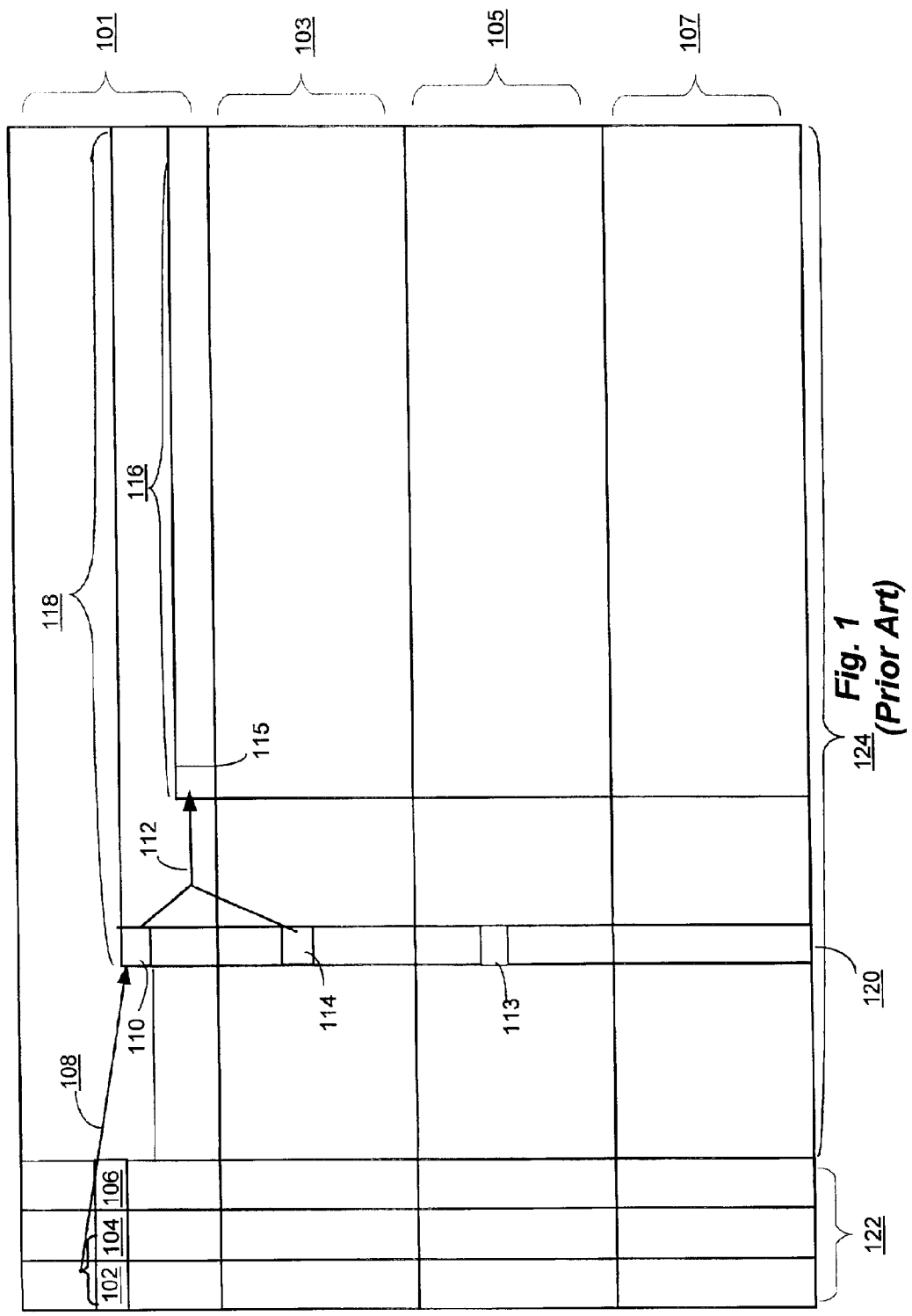
FIG. 1 is a schematic representation of four SONET message frames comprising a virtual superframe.

FIG. 1 depicts, as an illustrative example, four basic SONET/SDH STS-1/STM-1 message frames 101, 103, 105, and 107. As defined within the SONET specification, each SONET message frame has a frame length of 125 μ-seconds and includes data arranged in 9 rows by 90 columns. These 810 bytes of data are divided into two parts. The first part is the transport overhead 122, which includes the first 3 columns of data. The second part is the payload data area 124, which includes columns 4 through 90. The payload data area 124 includes a synchronized payload envelope (SPE) 118. As depicted in FIG. 1, the SPE 118 can extend between STS-1 message frames, wherein the SPE 118 associated with the first STS-1 message frame begins in a first frame 101 and ends in a second frame 103. Since the SPE 118 does not have to be aligned with the payload data area, over head bytes 102 and 104 are assigned as pointers to point 108 to the first byte of the SPE 118, and to identify when a positive or negative pointer adjustment is needed to be made by the H3 byte 106.

As discussed above, the SPE 118 can include one or more virtual tributaries (VTs) that are contained within seven virtual groups (VGs) in each STS-1 SPE. Four (4) consecutive STS-1 messages containing seven (7) VGs form a virtual superframe. The virtual superframe (superframe) defines a virtual SPE having a virtual envelope capacity that can vary from one superframe to another. The tributary units comprising the virtual superframe also contains payload pointers to allow for flexible and dynamic alignment of the VGs within the virtual superframe. In this instance, the payload pointer value indicates the offset from the beginning of the virtual superframe to the first byte of the VG.

Similarly, the SDH SPE can include one or more virtual containers (VCs) that are combined into transmission units (TUs) with the addition of overhead information. The Tugs are combined into transmission unit groups (TUGs) that are further combined into administrative units (AUs). Four consecutive 125 microsecond frames of the VC-4 are combined into a single 500 microsecond called a TU multi-frame. The tributary units comprising the TU multi-frame signal also contains payload pointers to allow for flexible and dynamic alignment of the VCs within the TU multi-frame. In this instance, the payload pointer value indicates the offset from the TU to the first byte of the lower order VC. This pointer mechanism allows both the virtual superframe and AU payloads to vary with respect to phase to one another and to the network as well, while allowing the VCs or VGs comprising the AUs and virtual superframes to be synchronously multiplexed.

The overhead data associated with the virtual superframe or the TU-multiframe are provided in a plurality of bytes that includes four (4) bytes used to perform payload pointer functions. The superframe/TU-multiframe overhead bytes V1 and V2, 110 and 114 respectively, are used to point 112 to the first byte 115 of the VT SPE 116. The V3 overhead byte 113 is used during VT pointer adjustment operations.

As discussed above with respect to the STS-1 SPE, the pointer adjustment mechanism includes the pair of bytes, H1 and H2, that identify the start of the next SONET/SDH payload byte and also indicate if the pointer adjustment byte, H3, is to be used. The supergroup or administrative unit group pointer adjustment occurs in substantially the same manner as described above with respect to the STS-1 message frame. The third overhead byte, V3, provides for active pointer adjustment when a negative justification of the virtual SPE is required. Positive justification involves marking the byte after the V3 byte as a dummy or stuff byte. These pointer adjustments, which occur in the V1 and V2 transmission overhead bytes, allow for eight (8) bits of data to be added to a virtual group (using the V3 overhead byte) or for eight (8) bits to be removed from the frame. This allows for the virtual superframe/TU multiframe to be re-framed and re-synched at a network node that has a slightly different network clock. Thus, in addition to the gap data necessary to compensate for payload data that is carried by a different frequency clock signal, eight bits of data may be added or removed at each network element in the network due to clock instability in the network.

In general, the two pointer vectors, i.e., the SONET/SDH transmission overhead H1 and H2 bytes and the virtual superframe/TU-multiframe pointers V1 and V2, are statistically independent of one another. As such, the period of one pointer vector is not correlated with the period and polarity of the other pointer vector.

Figure 2:
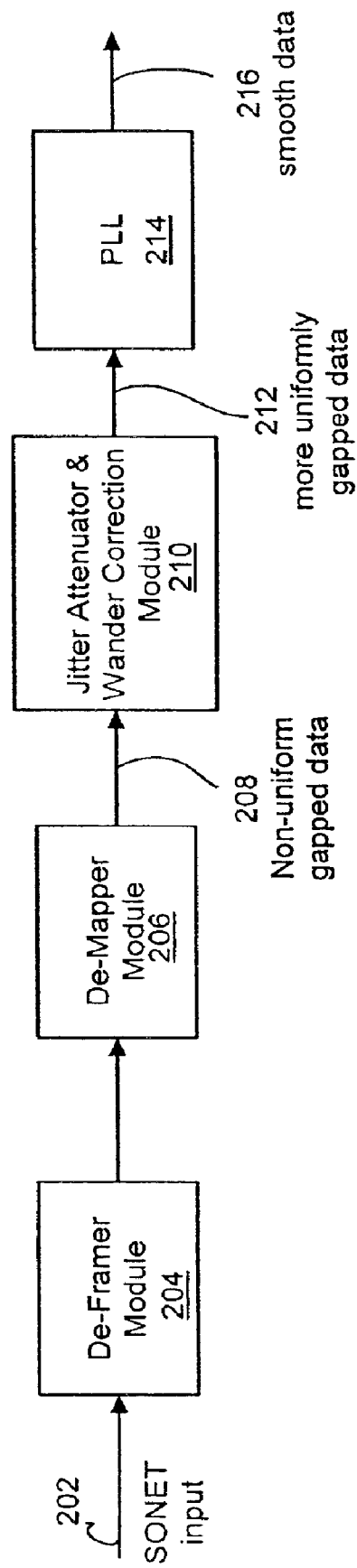
FIG. 2 is a schematic block diagram of a synchronous receiver incorporating the present invention.

As discussed above, the data received in a SONET/SDH message includes overhead bytes and gap bits within the data stream. FIG. 2 depicts a block diagram of a synchronous receiver that illustrates the various stages in a synchronous receiver and the level of non-uniformity or irregularity in the data received. A SONET/SDH message is received on line 202 by a de-framer 204. The de-framer 204 removes the overhead data bytes from messages leaving gaps in the data at the locations corresponding to the overhead data bytes. For example, the transmission overhead in a SONET/SDH message frame consists of the first three columns of data of each of the nine rows of data. Therefore, after the message has been de-framed, the first twenty-four bits of each row are gaps in the data where no data is contained. A de-mapper module 206 receives the de-framed SONET/SDH message and de-maps the data from the SONET/SDH SPE by removing any stuff bits that were added to the data to increase the data rate from the original data rate to the SONET/SDH data rate. Therefore, the data stream on line 208 includes a plurality of non-uniformly distributed gaps, which are due to the gaps in the data caused by the removed overhead data bytes and the data gaps caused by the mapping module.

As noted, the data stream on line 208 includes the non-uniformly-distributed data gaps within the data stream provided to the jitter attenuator/wander correction module 210. The module 210 will redistribute the data gaps within the data stream received via line 208 such that the data gaps are more uniformly-distributed than the original data stream, as used herein this data stream is referred to as a uniform data stream. This uniform data stream is provided on line 212 to the phase locked loop (PLL) 214. As will be explained in more detail below, the redistribution of the gaps within the data stream aids the PLL 214 in recovering a smooth data clock and therefore a smooth data signal carried on the smooth data clock from the more uniform data stream received on line 212. Thus, the PLL 214 provides a substantially smooth data stream on line 216.

Figure 3:
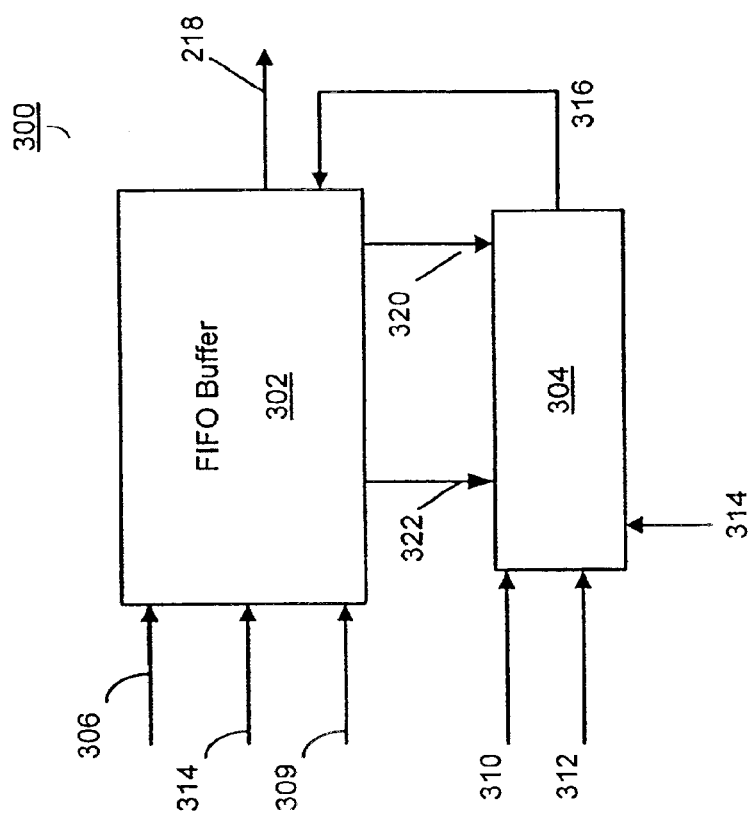
FIG. 3 is a block diagram of an embodiment of the present invention.

A method and apparatus consistent with the present apparatus for providing a more uniformly gapped data stream from non-uniformly gapped data extracted from a synchronous signal is disclosed. Referring to FIG. 3 a data smoothing apparatus 300 is depicted. The data smoothing apparatus 300 includes an elastic store 302 that includes a plurality of storage locations for storing incoming wide gapped data 306. As discussed above, the elastic store 302 receives the plurality of wide gapped data 306 from mapper and framer modules 204, 206 respectively in FIG. 2, that are part of a synchronous receiver 200 in FIG. 2. The elastic store 302 also receives the system clock 314 that is used to write the incoming data into the corresponding storage locations and the gap enable signal 309 from the mapper module. The elastic store 302 is configured and arranged to provide an elastic store fill signal 322 that is indicative of the number of the plurality of storage locations that are currently being used to store data. The elastic store also provides an elastic store center signal 320 that is indicative of the storage position at which point the elastic store is one-half full, that is the median storage location within the elastic store 302. The system clock 314 is typically not the clock signal recovered from the synchronous signal and in general is higher in frequency than the original nominal data clock. A gap enable signal 309 is also provided to the elastic store 302 to ensure that only proper data is written to the various storage locations within the elastic store 302.

A desynchronizer control 304 is coupled to the elastic store 302 and receives the elastic store fill signal 322 and the elastic store center signal 320. The desynchronizer control 304 also receives the system clock 314, and first and second pointer signals 310 and 312 from the framer and mapper modules of the synchronous receiver. The desynchronizer control 304 determines a uniform read enable signal 316 as a function of the first and second pointer signals 310 and 312, the elastic store fill signal 322, the elastic store center signal 320, and the system clock 314. The uniform read enable signal 316 is provided to the elastic store 302, wherein the elastic store, responsive to the uniform read enable signal 320, reads data from the plurality of storage locations and provides, as output, this data as more uniformly gapped data at a data rate of the original source. As discussed above, this uniform data stream is provided as desynchronized data, at a desynchronized data rate, that is more easily processed by a PLL. In the illustrated embodiments, the first pointer adjust signal is derived from the SONET overhead pointer adjustment bytes H1, H2, and H3, and the second pointer adjust signal is derived from the pointer virtual superframe or AU pointer adjustment bytes V1, V2, and V3.

Figure 4:
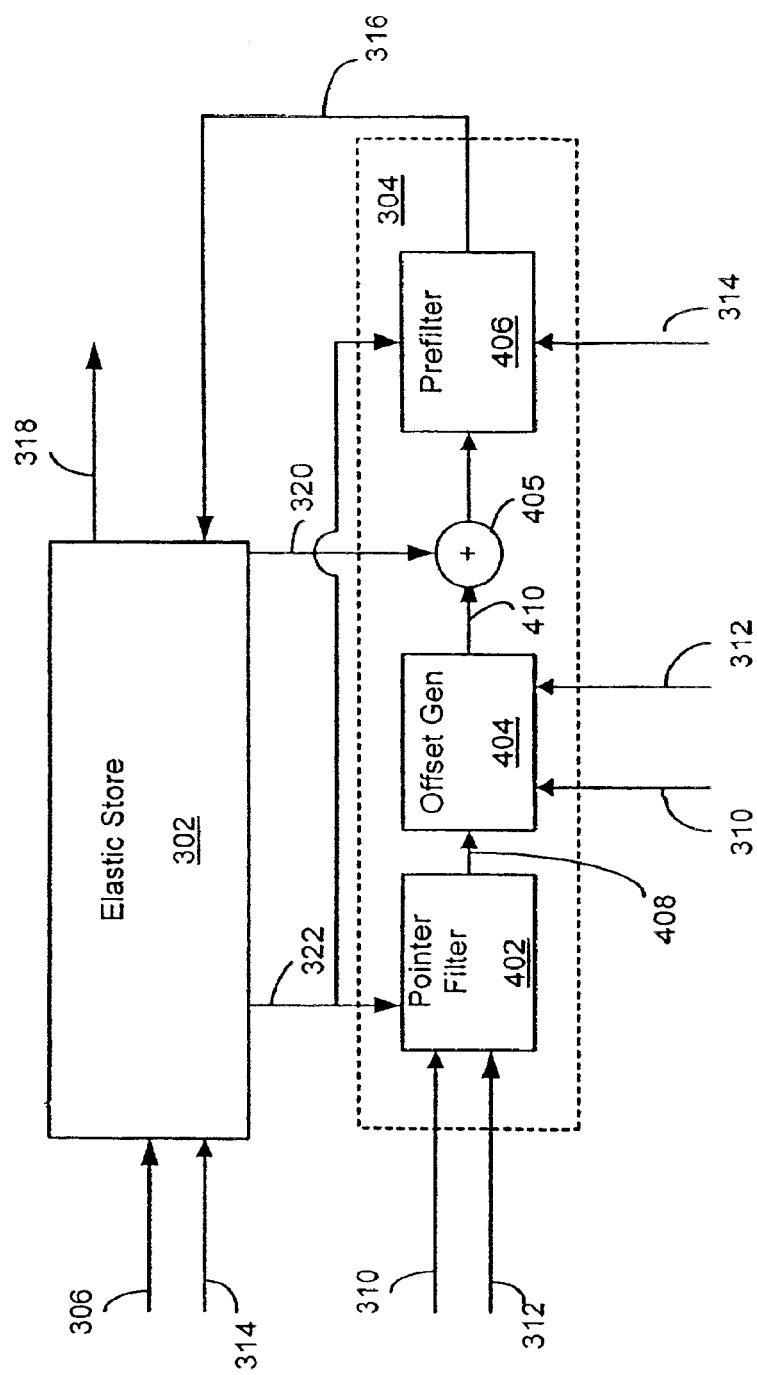
FIG. 4 is a more detailed block diagram of the desynchronizer illustrated in FIG. 3.

FIG. 4 depicts one embodiment of the data smoothing apparatus 300 in which desynchronizer control 304 includes a pointer filter 402, an offset generator 404, and prefilter 406. The pointer filter 402 receives the first pointer adjustment signal 310 and the second pointer adjustment signal 312 and the elastic store fill signal 322. The pointer filter 402 provides a bit-leak rate 408 that is a function of a characteristic of the first and second pointer adjustment signals, 310 and 312. In a preferred embodiment, the magnitude and period of the two pointer adjust signals 310 and 312 along with the elastic store fill signal 322 are used to determine the bit leak rate value 408. The bit-leak rate value 408 as well as the pointer adjust signals 310 and 312 are provided to the offset generator 404 that determines a center offset value 410. In one embodiment, the center offset value 410 is added to the FIFO center signal 320 and provided to the prefilter 406 as the offset center value 412. The prefilter 406 determines the uniform read enable signal 316 as a function of the system clock 314, the elastic store fill signal 322 and the offset center value 412.

As will be explained in more detail below, the prefilter 406 adjusts the output data rate of the elastic store proportionally to the magnitude of the difference between the amount of data stored in the elastic store and the elastic store center. In the illustrated embodiment, a SONET/SDH pointer adjustment is +/−eight (8) bits and the virtual superframe payload pointer adjustment is +/−eight (8) bits as well. Thus, there could be between negative sixteen (−16) bits and positive sixteen (+16) bits of data added or skipped over that must be absorbed by the desynchronizer without instantaneously affecting the output data rate from the elastic store 302.

As discussed above, the offset generator 404 provides a center offset value 410 in response to the received pointer adjustment signals 310 and 312. The center offset value 410 is combined with the FIFO center value 320 to provide the shifted center value 412 to the prefilter 406 that uses this value to determine the data output rate. The offset value 410 is related to, but is not necessarily equal to, the magnitude of the pointer adjustment.

To avoid large changes in the output data rate when a pointer adjust signal is received, the increase or decrease in the data rate is a function of the difference in magnitude between the number of bits stored in the elastic store and the offset elastic store center value. Over a period of time, by leaking bits from the elastic store 302, the magnitude of the offset center value used by the prefilter 406 is reduced to zero. Each change in the magnitude of the offset center offset value results in a momentary increase or decrease in the output data rate as one bit is "leaked" from the elastic store. Because the incoming data is bursty in nature, in one embodiment an average elastic store fill signal is used. Once the bit has been leaked, the average elastic store fill signal and the center value 310 used by the prefilter are equal again, and the output data rate is adjusted again such that the average value of the output data rate is equal to the nominal rate at which the synchronous data was written to the SPE. As the center offset is adjusted, the prefilter prevents any overflow or underflow in the elastic store, while at the same time, allowing bits to be leaked from the elastic store to effectively absorb any pointer adjustments without causing the output data rate to go beyond the system specification.

Figure 5:
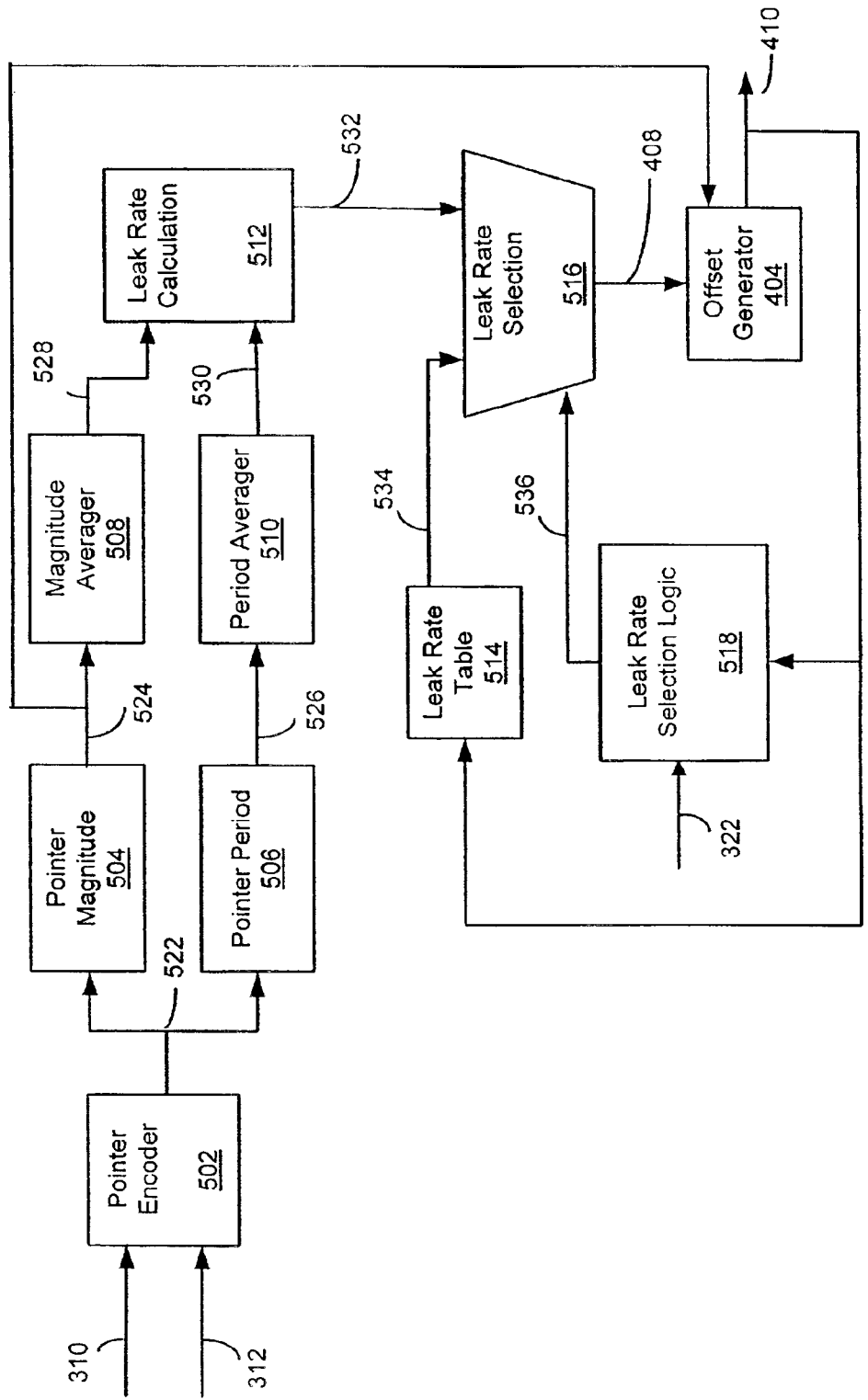
FIG. 5 is a more detailed block diagram of the pointer filter and offset generator illustrated in FIG. 4.

FIG. 5 illustrates one embodiment of a pointer filter 402 and offset generator 404 in accordance with the present invention. The pointer encoder 502 receives the first pointer adjustment signal 310 and the second pointer adjustment signal 312 and combines the two pointer adjustment signals into a composite pointer adjustment vector 522. The composite pointer adjustment vector 522 is provided to a pointer magnitude module 504 and a pointer period module 506. The pointer magnitude module 504 determines the magnitude 524 of the composite pointer adjustment vector 522, and the pointer period module 506 determines the period 526 of the composite pointer adjustment vector 522. As discussed above, the pointer adjustment signals 310 and 312 arrive at various times and since the two signals 310 and 312 are uncorrelated, they may arrive together or separately. Thus, there may or may not be two pointer adjustment signals at any given time for processing. If only one pointer adjustment signal is present at a given time, the contribution of the second pointer adjustment signal to the single pointer adjustment vector will be zero.

Over time, a plurality of pointer magnitude values 524 of the composite pointer adjustment vector 522 are provided to the magnitude average module 508 that performs an averaging calculation on at least a subset of the received magnitude values. Similarly, over time, a plurality of pointer period values 526 of the composite pointer adjustment vector 522 are provided to the period average module 510 that performs an averaging calculation on at least a subset of the received magnitude values. The average calculation is taken over a predetermined number of values.

In the illustrated embodiment, the magnitude and period averager modules, 508 and 510 respectively, are a combination of a front end FIR filter with variable weighting to the different stages therein, and a back end IIR filter that is used to extend the effective number of stages without adding additional hardware. The weighting of the samples in the FIR is modifiable to speed up the transient behavior of the filter. This aids during the startup transient period by allowing the filter to respond faster while maintaining adequate smoothing behavior in the normal steady state period. In a preferred embodiment, the coefficients of the FIR and IIR filters are selected to provide a low-pass filter response. It is possible to adjust the coefficients of the FIR and IIR filters to provide a band-pass or high-pass filter response if desired.

The magnitude average value 528 and the period average value 530 are provided to the bit-leak rate generator 512. The bit-leak generator 512 determines a calculated bit-leak rate 532 as a function of the average magnitude value 528 and the average period value 530 of the single pointer adjustment value 522. In one embodiment, the calculated bit-leak rate 532 is determined by dividing a scaled average magnitude value by the average period value 530. The scaled average magnitude value is obtained by multiplying the average magnitude average value 528 by the ratio of the carrier clock and the original data clock of the data carried in the message. Because the ratio of the two clocks is a constant, the multiplication can be performed equivalently in the pointer magnitude module 504, the magnitude averager module 508, or the bit leak rate calculator module 512. Other functions and operations may be used to determine the bit-leak rate 532. The calculated bit-leak rate 532 is provided to leak rate selection module 516.

In one embodiment, the instantaneous pointer magnitude value 524 is provided to the offset generator 404. In this embodiment, the offset generator 404 receives the instantaneous pointer magnitude signal 524 and adjusts the center offset value 410 accordingly.

The bit-leak rate selection module also receives a fixed bit-leak rate from bit-leak rate table 514. In general the bit leak table 514 will provide bit leak rates under three conditions. The first condition is during the startup of the pointer filter. As will be explained in more detail below, the averager/filter modules are typically various forms of digital filters. As is known, filters of this type are inaccurate during startup due to the need to initialize the filter with data. During this initialization period the instantaneous pointer magnitude is provided to the offset generator that will move the center offset in response to the received pointer. This offset is provided to the bit leak rate table 514 that has stored bit leak rates for varying center offset values. In one embodiment, the bit leak rates that are stored are the product of the ratio of the carrier clock and original data clock of the data carried in the message, multiplied by the pointer magnitude. When the center offset has been changed by a predetermined magnitude or the ranges in the bit leak rate table are not fast enough, it is inferred that enough data has been provided to the averager/filter modules 508 and 510 that the filters have been initialized. In the event that either of these conditions occur, then the leak rate selection logic 518 will shift the leak rate selection module to the calculated leak rate from leak rate calculation module 512.

The second circumstance is when the FIFO module has become nearly filled or nearly emptied such that the FIFO will imminently overflow or underflow. In this circumstance, the leak rate table includes leak rate values to quickly fill or empty data from the FIFO regardless of the pointer period average or magnitude.

A third circumstance during which the leak rate table will be used is if both the pointer filter streams are very slow. In this circumstance, the bit-leak rate table is provided and contains fixed bit-leak rates indexed according to various elastic store center offset values. The bit-leak rate table 514 receives the elastic store center offset values 410 from the offset generator 404 and outputs the corresponding fixed bit-leak rate 534 to the leak rate selection module 516.

As noted above, the leak rate selection module 516 is responsive to the leak rate selection logic 518 that provides the leak rate selection module 516 with a selection signal of which bit-leak rate to select. The leak rate selection logic 518 determines the proper selection according to the elastic store center offset value 410 received from the offset generator 404 and the elastic store fill signal 318 received from the elastic store 302. The necessary decision logic would be a function of the size of the elastic store and the system clock and would be selected to prevent elastic store overflow or underflow. The leak rate selection module 516 provides the bit-leak rate 408 to the offset generator 404. The offset generator then determines the elastic store center offset value 410 to provide to the prefilter 406.

Figure 6:
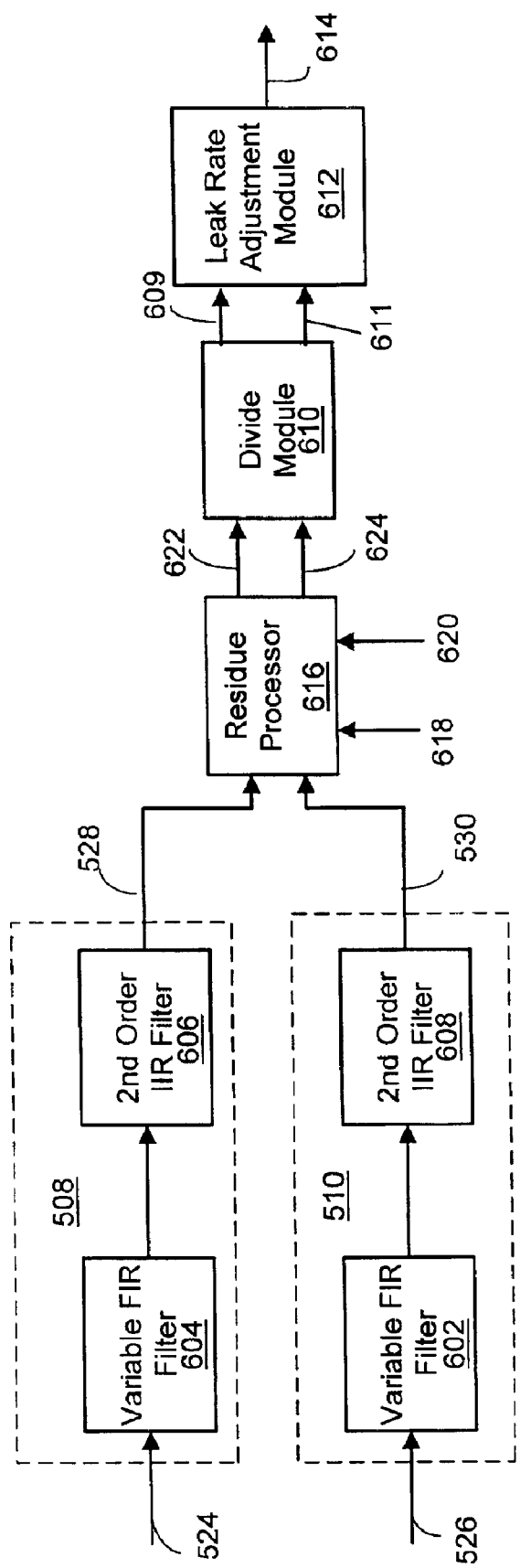
FIG. 6 is a more detailed block diagram of the leak rate calculation module depicted in FIG. 5.

FIG. 6 illustrates one embodiment of a leak rate calculator 412 suitable for use with the system described herein. The magnitude signal 524 and the period signal 526 are provided to variable FIR filters 604 and 602 respectively. The filtered output signals from each of the FIR filters 604 and 602 are provided to second order IIR filters 606 and 608 respectively. The second order IIR filters 606 and 608 provide as outputs the average magnitude signal 528 and the average period signal 530 respectively. Thus, the variable FIR filter 604 and the second order IIR filter 606 form the magnitude averager 508, and the variable FIR filter 602 and the second order IIR filter 608 form the period averager 510. The outputs 528 and 530 are provided as inputs into a residue processor 616. If a single pointer adjustment event occurs, the bit leak rate that is determined is sufficient so that all of the bits to be leaked will leak out in the predetermined time period. In the event that another pointer adjustment is received during the bit leak period, a new bit leak rate will need to be calculated that includes not only the pointer adjustment, but the bits remaining that have not been leaked from the previous pointer adjustment and the time remaining from the previous pointer adjustment. Thus, the residue processor 616 also receives as inputs the value of the remaining bits 618 and the remaining time 620 leftover when a subsequent pointer adjustment signal is received. The residue processor 616 combines these remaining bits 618 and time 620 into the bit leak rate value calculation. In one embodiment, the residue processor 616 adds the remaining bits 618 to the average magnitude signal 528 to form a composite magnitude signal 622. Similarly, the residue processor 616 adds the remaining time 620 to the average period signal 530 to form a composite period signal 624.

A divider module 610 receives the composite magnitude signal and the composite magnitude signal on lines 622 and 624 respectively and divides the composite period signal 624 by the composite magnitude signal 622. The divider module 610 provides two outputs, a first output 611 is the quotient of the division and is the unmodified leak rate value. The second output 609 is the remainder of the division and is the extra time necessary to leak the all the bits from the received pointer adjustments. The leak rate adjuster 612 combines the remaining time 609 and the unmodified leak rate 611 to produce the final leak rate 614 such that there is no remaining time.

Figure 7:
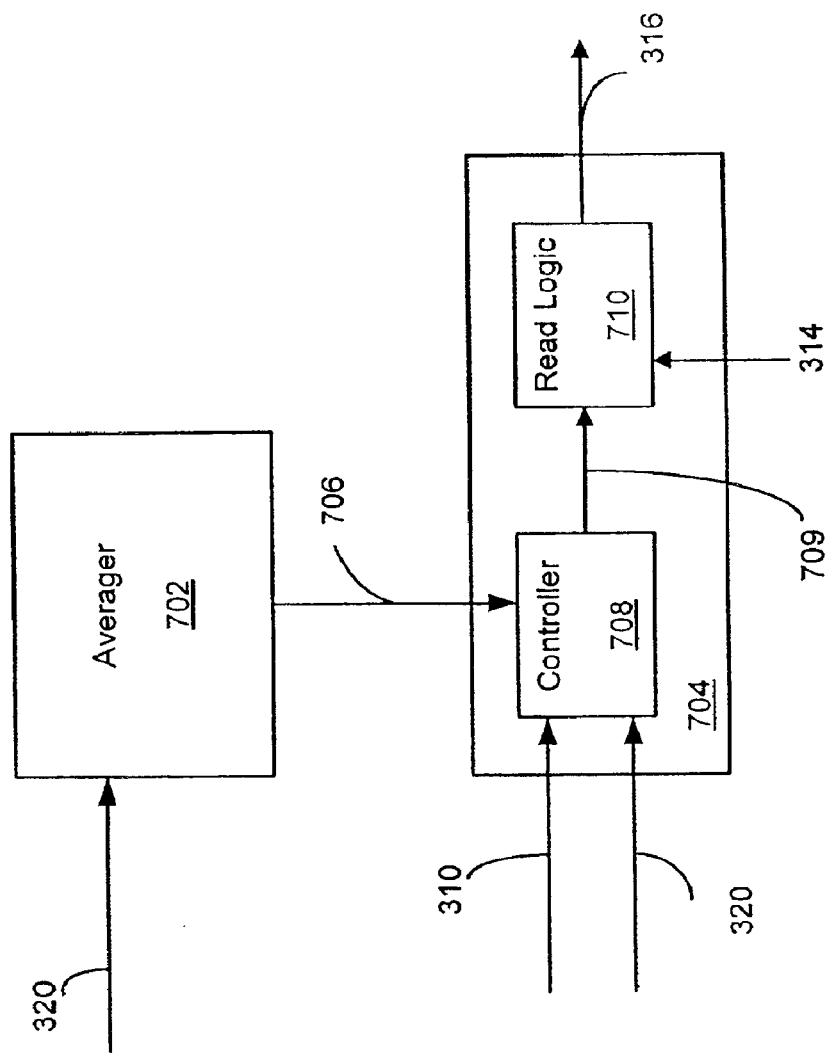
FIG. 7 is a more detailed block diagram of the prefilter illustrated in FIG. 4.

FIG. 7 illustrates one embodiment of the prefilter 406 in accordance with the apparatus for smoothing data disclosed herein. An averaging module 702 receives the elastic store fill signal 306 and provides an average fill signal 706 to a narrow band rate generator 704. The narrow band rate generator 704 includes a controller 708 and a read logic module 710. The controller 708 receives the elastic store center value 320, the elastic store center offset value 410, and the average fill signal 706. The controller determines the clock cycles on which to read out data from the elastic store and provides control signals 709 based on these clock cycles to the read logic 710. The read logic integrates the system clock signals 314 with the control signals 709 to provide the uniformly gapped read enable signals 316 to the elastic store 302.

The prefilter 406 provides a nearly constant output data rate that can vary within a narrow data rate range. In one embodiment the input data are a DS-3 data signal at 44.736 Mbit/s or an E3 data signal at 34.368 Mbit/s and the system clock 77.76 MHz. In this embodiment, if a data bit output on every clock cycle then the data rate would be 77.76 Mbit/s. If a data bit is output on every 2 out of 3 clock cycles then the output data rate would be 51.84 Mbit/s, which is the SONET data rate. If a data bit is output on every one out of three clock cycles, then the data rate would be 25.92 Mbit/s.

It can be seen that the nominal DS-3 and E-3 data signals are between the 25.92 Mbit/s and 51.84 Mbit/s data rates. Thus, by adjusting over time the number of clock cycles on which a data bit is output between one out of three and two out of three, the DS-3 or E-3 data rate may be obtained. The prefilter uses a combination of fixed and feedback components. As can be understood, at least one out of three clock cycles must carry data, one out of three clock cycles does not carry data and one out of the three clock cycles may optionally carry data. The prefilter 406 determines which of the one of optional clock cycles carries data based on the filtered FIFO fill signal 706, which is averaged over a period of time that is not a direct super or sub multiple of the frame period. The filtered FIFO fill signal 706 is compared to the FIFO center signal 320 and a bit is sent on an optional clock cycle if the average FIFO fill signal 706 is greater than the FIFO center signal 320.

Although the data enters the FIFO elastic store on the same 77.76 system clock, the data arrives in more non-uniform manner due to the overhead, stuff, and pointer adjustment bytes described above. It is possible for there to be gaps as large as 87 system clock cycles and frequent bursts of up to eight system clock cycles with continuous data. These long periods of data or gaps contribute to the low frequency wander and jitter components of the DS-3 or E3 data signal. The prefilter 406 re-orders these gaps or data into a more uniform narrow band output data signal. By re-ordering the data signal, the low frequency components of the wander and jitter are converted into higher frequency components and are more easily removed by the PLL 214.

Those of ordinary skill in the art should further appreciate that variations to and modification of the above-described methods using more complex filtering and feedback functions for smoothing data streams extracted from a synchronous signal may be made without departing from the inventive concepts disclosed herein. Accordingly, the invention should be viewed as limited solely by the scope and spirit of the appended claims.

What is claimed is:

1. An apparatus for providing a uniform data signal to an elastic store, the apparatus comprising:
   first and second pointer signals;
   a pointer encoder receiving the first and second pointer signals and providing a composite pointer signal having a period and a magnitude;
   a first filter receiving the composite pointer signal, the first filter configured and arranged to filter the magnitude of the composite pointer signal and to provide a first filtered signal;
   a second filter receiving the composite pointer signal, the second filter configured and arranged to filter the period of the composite pointer signal and to provide a second filtered signal;
   a bit leak rate calculator receiving the first and second filtered signals, the bit leak rate calculator configured and arranged to provide a bit leak rate value;
   an offset generator receiving the bit leak rate value, the offset generator configured and arranged to provide a center offset value;
   an elastic store having a plurality of storage locations at least a portion of which store data, the elastic store configured and arranged to provide an elastic store fill value indicative of the portion of storage locations containing data, the elastic store also configured and arranged to provide an elastic store center value indicative of the median storage location;
   a prefilter receiving a system clock signal, the elastic store fill value, the elastic store center value, and the center offset value, the prefilter configured and arranged to provide a uniform read enable signal to the elastic store, wherein the elastic store provides as an output a plurality of more-uniformly-gapped data.

2. The apparatus of claim 1 wherein the first filter provides a first signal indicative of the magnitude of the composite pointer signal, and a second signal indicative of the average of the magnitude of the composite pointer signal.

3. The apparatus of claim 2, wherein the bit leak rate calculator receives the first signal from the first filter, wherein the bit leak rate calculator responds to bursts of the first pointer signal.

4. The apparatus of claim 1 wherein the second filter provides a first signal indicative of the period of the composite pointer signal, and a second signal indicative of the average of the period of the composite pointer signal.

5. The apparatus of claim 2 wherein the second pointer adjustment signal is a virtual tributary superframe pointer adjustment signal.

6. The apparatus of claim 2 wherein the second pointer adjustment signal is a tributary unit multiframe pointer adjustment signal.

7. The apparatus of claim 2 wherein the first pointer adjustment signal is a SONET STS-1 pointer adjustment signal.

8. The apparatus of claim 2 wherein the second pointer adjustment signal is a TUG-3 pointer adjustment signal.

9. The apparatus of claim 1 wherein the prefilter includes:
   an averaging module receiving the elastic store fill signal, the averaging module configured and arranged to provide a first signal indicative of the average value of the elastic store fill signal;
   a narrowband rate generator receiving the first signal from the averaging module, the elastic store center value, the center offset value, and the system clock, the narrowband rate generator configured and arranged to provide as an output the uniform read enable signal.

10. The apparatus of claim 1 wherein the bit leak rate value is the first bit leak rate value and further comprising:
    a bit leak rate lookup table receiving the center offset value, the bit leak rate lookup table configured and arranged to provide a second bit leak rate value for a predetermined range of center offset values;
    a rate selection module receiving the center offset value, the second bit leak rate value, the first bit leak rate value, and the elastic store fill signal, the rate selection module configured and arranged to select one of the first and second bit leak rate values and provide the selected value to the offset generator.

11. A method for providing a uniformly gapped data signal from an elastic store, the method comprising the steps of:
    receiving first and second pointer adjustment signals;
    forming a composite pointer adjustment signal from the first and second pointer adjustment signals;
    receiving an elastic store fill value indicative of the amount of data stored in the elastic store;
    receiving an elastic store center value indicative of the median storage location in the elastic store;
    determining a bit leak rate value as a function of at least one characteristic of the composite pointer adjustment signal and the elastic store fill value;
    determining a center offset value as a function of the elastic store fill signal, the composite pointer value, and the bit leak rate;
    providing a uniformly gapped data signal as a function of the center offset value, the elastic store center value, and the elastic store fill value, wherein the step of determining a bit leak rate value includes the steps of:
  determining the magnitude of the composite pointer adjustment signal;
  determining the average magnitude of the composite pointer adjustment signal;
  determining the bit leak rate as a function of the magnitude of the composite pointer adjustment signal, the average magnitude of the composite pointer adjustment signal.

12. The method of claim 11 wherein the bit leak rate is the first bit leak rate, the method further comprising the steps of:
  determining a second bit leak rate value as a function of the center offset value;
  selecting between the first and second bit leak rates as a function of the elastic store fill value and the center offset value.

13. The method of claim 11 wherein the step of providing the uniformly gapped data signal includes the steps of:
  determining the average value of the elastic store fill value;
  generating the uniform data signal as a function of the elastic store center value, the center offset value, the average value of the elastic store fill value and the system clock.

* * * * *